US011591430B2

(12) United States Patent
Merlo et al.

(10) Patent No.: US 11,591,430 B2
(45) Date of Patent: Feb. 28, 2023

(54) METHOD FOR MAKING FLUOROPOLYMERS

(71) Applicant: SOLVAY SPECIALTY POLYMERS ITALY S.P.A., Bollate (IT)

(72) Inventors: Luca Merlo, Ixelles (BE); Claudio Oldani, Parabiago (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 468 days.

(21) Appl. No.: 16/495,094

(22) PCT Filed: Mar. 15, 2018

(86) PCT No.: PCT/EP2018/056474
§ 371 (c)(1),
(2) Date: Sep. 17, 2019

(87) PCT Pub. No.: WO2018/167190
PCT Pub. Date: Sep. 20, 2018

(65) Prior Publication Data
US 2020/0017621 A1    Jan. 16, 2020

(30) Foreign Application Priority Data

Mar. 17, 2017  (EP) .................................... 17161665
Sep. 21, 2017  (EP) .................................... 17192376

(51) Int. Cl.
C08F 14/18    (2006.01)
C08F 2/22     (2006.01)
C08F 259/08   (2006.01)

(52) U.S. Cl.
CPC .............. *C08F 259/08* (2013.01); *C08F 2/22* (2013.01); *C08F 14/18* (2013.01)

(58) Field of Classification Search
CPC ...... C08F 2/22; C08F 2/24; C08F 2/26; C08F 2/28; C08F 2/30; C08F 14/18; C08F 14/185; C08F 14/20; C08F 14/22; C08F 14/24; C08F 14/26; C08F 14/28; C08F 114/18; C08F 114/185; C08F 114/20; C08F 114/22; C08F 114/24; C08F 114/26; C08F 114/28; C08F 214/18; C08F 214/185; C08F 214/20; C08F 214/22; C08F 214/24; C08F 214/26; C08F 214/28
See application file for complete search history.

(56) References Cited

U.S. PATENT DOCUMENTS

| 4,940,525 | A | | 7/1990 | Ezzell et al. |
| 5,285,002 | A | | 2/1994 | Grootaert |
| 5,608,022 | A | † | 3/1997 | Nakayama |
| 2007/0015864 | A1 | | 1/2007 | Hintzer et al. |
| 2007/0015865 | A1 | | 1/2007 | Hintzer et al. |
| 2007/0015866 | A1 | | 1/2007 | Hintzer et al. |
| 2007/0025902 | A1 | | 2/2007 | Hintzer et al. |
| 2007/0276103 | A1 | | 11/2007 | Guerra et al. |
| 2010/0160531 | A1 | † | 6/2010 | Leffew |
| 2012/0178017 | A1 | † | 7/2012 | Murai |

FOREIGN PATENT DOCUMENTS

| EP | 341716 | A2 | | 11/1989 |
| EP | 1172382 | A2 | | 1/2002 |
| EP | 1323751 | A2 | | 7/2003 |
| JP | H11181009 | A | † | 7/1999 |
| JP | 2013-545877 | A | | 12/2013 |
| WO | 03020836 | | † | 3/2003 |
| WO | 2013085864 | A2 | | 6/2013 |

OTHER PUBLICATIONS

Office Action issued in corresponding KR Application No. 10-2019-7030009 with English translation dated Oct. 26, 2022 (13 pages).
Gore Fabrics' Goal and Roadmap for Eliminating PFCs of Environmental Concern, pp. 1-6 and Annex 1-3, Gore Creative Technologies Worldwide, Jan. 31, 2017.†
Alberts et al., Molecular Biology of the Cell, 3rd Edition, pp. 958, 959, 963-971, 539, and 1006-1009, Garland Publishing, Inc., Mar. 3, 1994.†
Walmor C. De Mello, Cell-to-Cell Communication, pp. 34-49, Plenum Press New York and London, 1987.†
Eric C. Beyer, Gap Junctions, Molecular Biology of Receptors and Transporters, Pumps, Transporters, and Channels, vol. 137C, International Review of Cytology; A Survey of Cell Biology, pp. 1-37, Academic Press, Inc., Harcourt Brace Jovanovich, Publishers, 1993.†
Data analysis of the identification of correlations between polymer characteristics and potential for health or ecotoxicological concern, Environment Directorate, Joint meeting of the chemicals committee and the working party on chemicals, pesticides and biotechnology, Organisation for Economic Co-operation and Development, pp. 1-41, https://www.oecd.org/env/ehs/risk-assessment/42081261.pdf, Jan. 27, 2009.†
Gore Fabrics' Goal and Roadmap for Eliminating PFCS of Environmental Concern, W. L. Gore & Associates, Inc., 2017, retrieved on Mar. 25, 2020, at https://www.gore-tex.com/technology/responsibility/pfc-goal (9 pages total).†
Walmor C. De Mello, Cell-to-Cell Communication, Plenum Press New York and London, 1987, pp. 34-49 (18 pages total).†
Eric C. Beyer, Gap Junctions, Molecular Biology of Receptors and Transporters, Pumps, Transporters, and Channels, International Review of Cytology, vol. 137C, 1993, pp. v, 1-37 (40 pages total).†
Bernhard Kiehl, Gore Fabrics' Goal and Roadmap for Eliminating PFCs of Environmental Concern, Gore Fabrics, 2017 (11 pages total).†

(Continued)

Primary Examiner — Irina S Zemel
Assistant Examiner — Jeffrey S Lenihan
(74) Attorney, Agent, or Firm — Osha Bergman Watanabe & Burton LLP

(57) ABSTRACT

The invention pertains to a method of making fluoropolymer dispersions using certain polymeric derivatives including a plurality of ionisable groups selected from the group consisting of $-SO_3X_a$, $-PO_3X_a$ and $-COOX_a$, whereas $X_a$ is H, an ammonium group or a monovalent metal, and to fluoropolymer dispersions therefrom.

19 Claims, No Drawings

(56) References Cited

OTHER PUBLICATIONS

Bruce Alberts et al., Molecular Biology of The Cell, Third Edition, Garland Publishing, Inc., 1994, pp. xxxii-xxxiii, 958-959, 963-971, 539, 1006-1009 (20 pages total).†

Organization for Economic Co-operation and Development (OECD), Data Analysis of the Identification of Correlations Between Polymer Characteristics and Potential for Health or Ecotoxicological Concern, 2009, pp. 1-41 (41 pages total).†

† cited by third party

METHOD FOR MAKING FLUOROPOLYMERS

CROSS-REFERENCE TO RELATED APPLICATIONS

This application is a U.S. national stage entry under 35 U.S.C. § 371 of International Application No. PCT/EP2018/056474 filed Mar. 15, 2018, which claims priority to European application No. 17161665.9, filed on Mar. 17, 2017, and to European application No. 17192376.6, filed on Sep. 21, 2017. The entire contents of these applications are explicitly incorporated herein by this reference.

TECHNICAL FIELD

The present invention pertains to a method of making fluoropolymer dispersions using certain polyfunctional polymeric derivatives, and to fluoropolymer dispersions therefrom.

BACKGROUND ART

Fluoropolymers, i.e. polymers having a fluorinated backbone, have been long known and have been used in a variety of applications because of several desirable properties such as heat resistance, chemical resistance, weatherability, UV-stability etc.

A frequently used method for producing fluoropolymers involves aqueous emulsion polymerization of one or more fluorinated monomers generally involving the use of fluorinated surfactants. Frequently used fluorinated surfactants include perfluorooctanoic acids and salts thereof, in particular ammonium perfluorooctanoic acid.

Recently, perfluoroalkanoic acids having 8 or more carbon atoms have raised environmental concerns. For instance, perfluoroalkanoic acids have been found to show bioaccumulation. Accordingly, efforts are now devoted to phasing out from such compounds and methods have been developed to manufacture fluoropolymer products using alternative surfactants having a more favourable toxicological profile.

Several approaches have been recently pursued to this aim, typically involving fluorosurfactants comprising a perfluoroalkyl chain interrupted by one or more catenary oxygen atoms, said chain having an ionic carboxylate group at one of its ends.

Examples of these compounds which are endowed with improved bioaccumulation profile over perfluoro alkanoic acids having 8 or more carbon atoms can be found notably in US 2007276103 (3M INNOVATIVE PROPERTIES CO) Nov. 29, 2007, US 2007015864 (3M INNOVATIVE PROPERTIES CO) Jan. 18, 2007, US 2007015865 (3M INNOVATIVE PROPERTIES CO) Jan. 18, 2007, US 2007015866 (3M INNOVATIVE PROPERTIES CO) Jan. 18, 2007.

Generally speaking, while all these approaches targeting alternative fluorinated surfactants which desirably show lower bioaccumulation/bio-persistence than perfluoro alkanoic acids having 8 or more carbon atoms still may involve the use of fluorocompounds which may be highly fluorinated, and/or which may have a molecular weight low enough to possibly enable them to permeate live cells' membranes, and which may nonetheless have a certain (bio-)persistence.

Additional efforts have been hence undertaken for developing solutions where substantially no such possibly harmful compounds are used, but wherein the stabilizing/dispersing agent system used be such that polymerization can be carried out in a convenient and cost effective way, using same equipment commonly used in the aqueous emulsion polymerization of fluorinated monomers with traditional surfactants, achieving reasonable productivities and acceptable latex stability.

EP 0341716 A (ASAHI GLASS CO LTD) Nov. 15, 1989 is directed to a process for preparing an aqueous dispersion, which comprises subjecting a monomer to emulsion polymerization in an aqueous medium in the presence of a fluorine-containing copolymer comprising units derived from a fluoroolefin, and units having a hydrophilic side chain having a group which maybe: (i) a carboxylic acid group or a carboxylate group of the formula —COOM, (ii) a sulfonic acid group or a sulfonate group of the formula —$SO_3M$ and (iii) a phosphonic acid group or a phosphonate group of the formula —PO3M (wherein M is hydrogen, an alkali metal, a quaternary ammonium group, or a quaternary phosphonium group), and (iv) an amido group, and having a number average molecular weight at a level of from 1,000 to 500,000, particularly from 3,000 to 400,000. As per the monomer, a fluoroolefin having from 2 to 4 carbon atoms such as hexafluoropropylene, pentafluoropropylene, tetrafluoroethylene, chlorotrifluoroethylene, trifluoroethylene or vinylidenefluoride, and a vinyl compound, an allyl compound, a fluorinated vinyl compound or a fluorinated allyl compound are preferred, since their polymerization gives rise to an aqueous dispersion capable of providing a coating layer having excellent weather resistance.

DISCLOSURE OF INVENTION

It has been found that certain polyfunctional dispersants, as below detailed, are effective in the aqueous emulsion polymerization of fluoromonomers, in particular of tetrafluoroethylene and/or of vinylidene fluoride, even when used without the addition of other surfactants, including fluorinated surfactants, enabling appreciable polymerization kinetics and providing stable dispersions.

Thus, in one aspect, the invention relates to a method for making a fluoropolymer comprising emulsion polymerizing one or more than one fluorinated monomer in an aqueous medium wherein said aqueous emulsion polymerization is carried out in an aqueous medium in the presence of at least one radical initiator and at least one polyfunctional dispersant [dispersant (D)], said dispersant (D):
- comprising a backbone chain comprising recurring units derived from one or more ethylenically unsaturated monomers,
- having a molecular weight and distribution thereof such that said dispersant (D) is substantially free from fractions having molecular weight of less than 3 000,
- comprising a plurality of ionisable groups selected from the group consisting of —$SO_3X_a$, —$PO_3X_a$ and —$COOX_a$, whereas $X_a$ is H, an ammonium group or a monovalent metal, in an amount of at least 1.75 meq/g, with respect to the weight of dispersant (D), wherein the said dispersant (D) is used in an amount of 0.01% by weight and 5.00% by weight, based on the total weight of the aqueous medium.

The Applicant has surprisingly found that dispersant (D), thanks to the presence of suitable concentration of ionisable groups as pendant groups in the fluorinated chain, despite the high molecular weight thereof, possesses sufficient surface active effect and dispersing ability for ensuring efficient stabilization of fluoropolymer dispersion during polymerization. Further, in addition, although dispersant (D) residues may be comprised in the fluoropolymer so manufactured, the same are not causing any discoloration or bubbling issues upon further processing of the fluoropolymer, thanks to their low volatility and high thermal stability.

In the method of making a fluoropolymer, one or more dispersants (D) are used in the aqueous emulsion polymerization of one or more fluorinated monomers, in particular gaseous fluorinated monomers.

By gaseous fluorinated monomers is meant monomers that are present as a gas under the polymerization conditions. In a particular embodiment, the polymerization of the fluorinated monomers is started in the presence of the dispersants (D), i.e. the polymerization is initiated in the presence of the same. The amount of dispersants (D) used may vary within the mentioned range depending on desired properties such as amount of solids, monomers' conversion, etc. . . . . Generally the amount of dispersant (D) will be of at least 0.05% wt, preferably of at least 0.10% wt and advantageously at most 4.00% wt, preferably at most 3.50% wt, even more preferably at most 3.00% wt with respect to the total weight of the aqueous medium. A practical range is between 0.15% wt and 2.75% wt, with respect to the total weight of the aqueous medium.

While the polymerization is generally initiated in the presence of the dispersant (D), it is not excluded to add further dispersant (D) during the polymerization, although such will generally not be necessary.

As above explained, dispersant (D) is a polymer having a molecular weight and distribution thereof such that said dispersant (D) is substantially free from fractions having molecular weight of less than 3 000.

Determination of substantial absence of fractions having molecular weight of less than 3 000 can be done using GPC technique, with respect to polystyrene standards, using dimethylacetamide as eluent.

The expression "substantially free" in connection with dispersant (D) and fractions having molecular weight of less than 3 000 is intended to mean that said fractions are not detectable via GPC technique, as detailed above.

The choice of a dispersant (D) substantially free from fractions having molecular weight of less than 3 000 is particularly advantageous for ensuring that dispersant (D) has a toxicological profile such not to be able to penetrate live cells' membranes.

Generally speaking, dispersant (D) generally possess a weight averaged molecular weight ($M_W$), as measured by GPC with respect to polystyrene standards, using dimethylacetamide as eluent, of at least 10 000, preferably of at least 15 000.

On the other side, upper boundaries for the weight averaged molecular weight ($M_W$), as measured by GPC with respect to polystyrene standards, using dimethylacetamide as eluent, of dispersant (D) are not particularly critical, provided the dispersant (D) possesses an amount of ionisable groups, as mentioned above, enabling the same to be endowed with adequate dispersability.

It is nonetheless understood that a practical range for the weight averaged molecular weight of the dispersant (D) is generally of at most 1 000 000, preferably at most 600 000, more preferably at most 300 000.

Preferably the dispersant (D) possesses a weight averaged molecular weight of at least 20 000, preferably of at least 25 000 and/or advantageously of at most 250 000, preferably of at most 200 000.

Particularly good results have been obtained with dispersants possessing a weight averaged molecular weight of from 25 000 to 150 000.

As said, dispersant (D) comprises a plurality of ionisable groups selected from the group consisting of —$SO_3X_a$, —$PO_3X_a$ and —$COOX_a$, whereas $X_a$ is H, an ammonium group or a monovalent metal. Preferably dispersant (D) comprises a plurality of ionisable groups selected from the group consisting of —$SO_3X_a$, and —$COOX_a$, whereas $X_a$ is H, an ammonium group or a monovalent metal.

The amount of said ionisable groups in dispersant (D) is generally of at least 1.80, preferably at least 1.90, more preferably at least 2.00 meq/g, with respect to the weight of dispersant (D). Dispersants (D) which possess an amount of ionisable group of less than 1.75 meq/g possess no sufficient polarity for solubilizing in the water phase and producing a stabilizing/surfactant-like effect. There's no substantial limitation as per the maximum amount of the said ionisable groups comprised in dispersant (D). It is generally understood that the said ionisable groups are generally present in an amount of at most 2.50 meq/g, preferably at most 2.20 meq/g, more preferably at most 2.00 meq/g.

Dispersant (D) comprises said ionisable groups as pendant groups covalently bound to recurring units derived from an ethylenically unsaturated functional monomer (monomer (X), herein below).

Dispersant (D) may consist essentially of recurring units derived from one or more than one monomer (X), as above detailed, or can be a copolymer comprising recurring units derived from one or more than one monomer (X) and recurring units derived from one or more than one additional monomer different from monomer (X).

Generally, monomer (X) is a fluorinated monomer; one or more than one additional monomer different from monomer (X) may be a fluorinated monomer. The expression 'fluorinated monomer' is intended to encompass ethylenically unsaturated monomers comprising at least one fluorine atom.

According to certain embodiment's of the invention, dispersant (D) is polymer comprising a plurality of —$SO_3X_a$ groups, as above detailed, that is to say a dispersant ($D_{SO3X}$).

Dispersant ($D_{SO3X}$) may consist essentially of recurring units derived from one or more than one ethylenically unsaturated functional monomer comprising a —$SO_3X_a$ group [monomer ($X_{SO3X}$)], or can comprise recurring units derived from one or more than one monomer ($X_{SO3X}$) and recurring units derived from one or more than one additional monomer different from monomer ($X_{SO3X}$), in particular one or more than one additional fluorinated monomer different from monomer ($X_{SO3X}$).

The expression 'recurring units deriving from' in connection with a particular monomer ($X_{SO3X}$) is intended to encompass recurring units as derived/directly obtained from polymerizing the said particular monomer, and corresponding recurring units derived/obtained by further modification/post-treatment of the same, e.g. by hydrolysis; in other terms a dispersant comprising recurring units derived from one or more than one monomer ($X_{SO3X}$), may be e.g. obtained by polymerizing monomers comprising a sulfonyl halide group, and subsequent hydrolysis of the same.

Suitable preferred dispersants ($D_{SO3X}$) comprising a plurality of —$SO_3X_a$ group are those polymers comprising recurring units deriving from at least one ethylenically unsaturated fluorinated monomer containing at least one —$SO_2X$ group, with X being a halogen (eg. F) or —$OX_a$, with $X_a$ as above (monomer (A), hereinafter); and recurring units deriving from at least one ethylenically unsaturated fluorinated monomer free from —$SO_2X$ group, as above detailed (monomer (B), hereinafter).

The phrase "at least one monomer" is used herein with reference to monomers of both type (A) and (B) to indicate that one or more than one monomer of each type can be present in the dispersant ($D_{SO3X}$).

Hereinafter the term monomer will be used to refer to both one and more than one monomer of a given type.

Non limiting examples of suitable monomers (A) are:

sulfonyl halide fluoroolefins of formula: $CF_2=CF(CF_2)_p SO_2X$, with X being $OX_a$, with $X_a$ as above detailed; F or Cl, preferably F, wherein p is an integer between 0 and 10, preferably between 1 and 6, more preferably p is equal to 2 or 3;

sulfonyl halide fluorovinylethers of formula: $CF_2=CF—O—(CF_2)_m SO_2X$, with X being $OX_a$, with $X_a$ as above detailed; F or Cl, preferably F, wherein m is an integer between 1 and 10, preferably between 1 and 6, more preferably between 2 and 4, even more preferably m equals 2;

sulfonyl fluoride fluoroalkoxyvinylethers of formula: $CF_2=CF—(OCF_2CF(R_{F1}))_w—O—CF_2(CF(R_{F2}))_y SO_2X$ with X being $OX_a$, with $X_a$ as above detailed; F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F;

sulfonyl halide aromatic fluoroolefins of formula $CF_2=CF—Ar—SO_2X$ with X being $OX_a$, with $X_a$ as above detailed; F or Cl, preferably F, wherein Ar is a $C_5$-$C_{15}$ aromatic or heteroaromatic group.

Preferably monomer (A) is selected from the group of the sulfonyl fluoride fluorovinylethers of formula $CF_2=CF—O—(CF_2)_m—SO_2F$, wherein m is an integer between 1 and 6, preferably between 2 and 4.

More preferably monomer (A) is $CF_2=CFOCF_2CF_2—SO_2F$ (perfluoro-5-sulfonylfluoride-3-oxa-1-pentene).

Non limiting examples of suitable ethylenically unsaturated fluorinated monomers of type (B) are:

$C_2$-$C_8$ perfluoroolefins, such as tetrafluoroethylene (TFE), hexafluoropropylene (HFP), perfluoroisobutylene;

$C_2$-$C_8$ hydrogen-containing fluoroolefins, such as trifluoroethylene (TrFE), vinylidene fluoride (VDF), vinyl fluoride (VF), pentafluoropropylene, and hexafluoroisobutylene;

$C_2$-$C_8$ chloro- and/or bromo- and/or iodo-containing fluoroolefins, such as chlorotrifluoroethylene (CTFE) and bromotrifluoroethylene;

fluoroalkylvinylethers of formula $CF_2=CFOR_{f1}$, wherein $R_{f1}$ is a $C_1$-$C_6$ fluoroalkyl, e.g. —$CF_3$, —$C_2F_5$, —$C_3F_7$;

fluorooxyalkylvinylethers of formula $CF_2=CFOX_0$, wherein $X_0$ is a $C_1$-$C_{12}$ fluorooxyalkyl group comprising one or more than one ethereal oxygen atom, including notably fluoromethoxyalkylvinylethers of formula $CF_2=CFOCF_2OR_{f2}$, with $R_{f2}$ being a $C_1$-$C_3$ fluoro(oxy)alkyl group, such as —$CF_2CF_3$, —$CF_2CF_2$—O—$CF_3$ and —$CF_3$ fluorodioxoles, of formula:

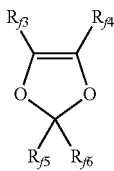

wherein each of $R_{f3}$, $R_{f4}$, $R_{f5}$, $R_{f6}$, equal or different each other, is independently a fluorine atom, a $C_1$-$C_6$ fluoro(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferably monomer (B) is selected among:

$C_2$-$C_8$ perfluoroolefins selected from tetrafluoroethylene (TFE) and/or hexafluoropropylene (HFP);

$C_2$-$C_8$ hydrogen-containing fluoroolefins, selected from trifluoroethylene (TrFE), vinylidene fluoride (VDF), and vinyl fluoride (VF); and mixtures thereof.

According to these embodiment's, preferably, dispersant ($D_{SO3X}$) is a fluorinated polymer comprising a plurality of —$SO_3X_a$ functional groups, and consisting essentially of recurring units deriving from at least one ethylenically unsaturated fluorinated monomer (A) containing at least one sulfonyl fluoride functional group and from at least one ethylenically unsaturated fluorinated monomer (B).

End-groups, impurities, defects and other spurious units in limited amount (less than 1% moles, with respect to total moles of recurring units) may be present in the preferred polymer, in addition to the listed recurring units, without this affecting substantially the properties of the dispersant ($D_{SO3X}$).

According to certain embodiments, at least one monomer (B) of the dispersant ($D_{SO3X}$) is TFE. Dispersants ($D_{SO3X}$) wherein at least one monomer (B) is TFE will be hereby referred to as dispersants ($D^{TFE}_{SO3X}$).

Preferred dispersants ($D^{TFE}_{SO3X}$) are selected from polymers consisting essentially of:

(1) recurring units derived from tetrafluoroethylene (TFE), these recurring units (1) being generally in an amount of 50 to 99% moles, preferably 50 to 98% moles, with respect to total moles of dispersant ($D^{TFE}_{SO3X}$);

(2) recurring units derived from at least one monomer selected from the group consisting of:

(j) sulfonyl halide fluorovinylethers of formula: $CF_2=CF—O—(CF_2)_m SO_2X$, with X being $OX_a$, with $X_a$ as above detailed; F or Cl, preferably F, wherein m is an integer between 1 and 10, preferably between 1 and 6, more preferably between 2 and 4, even more preferably m equals 2;

(jj) sulfonyl fluoride fluoroalkoxyvinylethers of formula: $CF_2=CF—(OCF_2CF(R_{F1}))_w—O—CF_2(CF(R_{F2}))_y SO_2X$ with X being $OX_a$, with $X_a$ as above detailed; F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F; and (jjj) mixtures thereof;

these recurring units (2) being generally in an amount of 1 to 50% moles, preferably 2 to 50% moles, with respect to total moles of dispersant ($D^{TFE}_{SO3X}$); and (3) optionally, recurring units derived from at least one hydrogenate and/or fluorinated monomer different from TFE, preferably a perfluorinated monomer, generally selected from the group consisting of hexafluoropropylene, perfluoroalkylvinylethers of formula $CF_2=CFOR'_{f1}$, wherein $R'_{f1}$ is a $C_1$-$C_6$ perfluoroalkyl, e.g. —$CF_3$, —$C_2F_5$, —$C_3F_7$; perfluoro-oxyalkylvinylethers of formula $CF_2=CFOR'_{O1}$, wherein $R'_{O1}$ is a $C_2$-$C_{12}$ perfluoro-oxyalkyl having one or more ether groups, including e.g. perfluoroalkyl-methoxy-vinylethers of formula $CF_2=CFOCF_2OR'_{f2}$ in which $R'_{f2}$ is a $C_1$-$C_6$ perfluoroalkyl, e.g. —$CF_3$, —$C_2F_5$, —$C_3F_7$ or a $C_1$-$C_6$ perfluorooxyalkyl having one or more ether groups, like —$C_2F_5$—O—$CF_3$; these recurring units (3) being generally in an amount of 0 to 45% moles, preferably 0 to 40% moles, with respect to total moles of dispersant ($D^{TFE}_{SO3X}$).

According to certain embodiment's, the preferred dispersant ($D^{TFE}_{SO3X}$) generally consists essentially of:
(1) from 50 to 95% moles, preferably from 55 to 93% moles of recurring units derived from TFE;
(2) from 5 to 50% moles, preferably from 7 to 45% moles of recurring units derived from —$SO_2X$ groups-containing monomer(s) (2), as above detailed;
(3) from 0 to 25% moles, preferably from 0 to 20% moles of recurring units derived from fluorinated monomer(s) different from TFE (3), as above detailed.

According to certain other embodiments, at least one monomer (B) of the dispersant ($D_{SO3X}$) is VDF. Dispersants ($D_{SO3X}$) wherein at least one monomer (B) is VDF will be hereby referred to as dispersants ($D^{VDF}_{SO3X}$).

Preferred dispersants ($D^{VDF}_{SO3X}$) are selected from polymers consisting essentially of:
(1) recurring units derived from vinylidene fluoride (VDF), these recurring units (1) being generally in an amount of 55 to 99% moles, preferably 65 to 95% moles, with respect to total moles of dispersant ($D^{VDF}_{SO3X}$);
(2) recurring units derived from at least one monomer selected from the group consisting of:
(j) sulfonyl halide fluorovinylethers of formula: $CF_2=CF$—O—$(CF_2)_mSO_2X$, with X being $OX_a$, with $X_a$ as above detailed, F or Cl, preferably F, wherein m is an integer between 1 and 10, preferably between 1 and 6, more preferably between 2 and 4, even more preferably m equals 2;
(jj) sulfonyl fluoride fluoroalkoxyvinylethers of formula: $CF_2=CF$—$(OCF_2CF(R_{F1}))_w$—O—$CF_2(CF(R_{F2}))_y$ $SO_2X$
with X being $OX_a$, with $X_a$ as above detailed, F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F; and
(jjj) mixtures thereof;
these recurring units (2) being generally in an amount of 1 to 45% moles, preferably 5 to 35% moles, with respect to total moles of dispersant ($D^{VDF}_{SO3X}$); and
(3) optionally, recurring units derived from at least one hydrogenated monomer or fluorinated monomer different from VDF; these recurring units (3) being generally in an amount of 0 to 25% moles, preferably 0 to 15% moles, with respect to total moles of dispersant ($D^{VDF}_{SO3X}$).

According to certain embodiment's, the preferred dispersant ($D^{VDF}_{SO3X}$) generally consists essentially of:
(1) from 55 to 95% moles, preferably from 60 to 92% moles of recurring units derived from VDF;
(2) from 5 to 45% moles, preferably from 8 to 40% moles of recurring units derived from —$SO_2X$ groups-containing monomer(s) (2), as above detailed;
(3) from 0 to 15% moles, preferably from 0 to 10% moles of recurring units derived from hydrogenated or fluorinated monomer(s) different from VDF (3), as above detailed.

The dispersants ($D_{SO3X}$) may be prepared by any polymerization process known in the art. Suitable processes for the preparation of such polymers are for instance those described in U.S. Pat. No. 4,940,525 (THE DOW CHEMICAL COMPANY) Jul. 10, 1990, EP 1323751 A (SOLVAY SOLEXIS SPA) Jul. 2, 2003, EP 1172382 A (SOLVAY SOLEXIS SPA) Nov. 16, 2002.

The aqueous emulsion polymerization may be carried out at a temperature between 10° C. to 150° C., preferably 20° C. to 130° C. and the pressure is typically between 2 and 60 bar, in particular 5 to 45 bar.

The reaction temperature may be varied during the polymerization e.g. for influencing the molecular weight distribution, i.e., to obtain a broad molecular weight distribution or to obtain a bimodal or multimodal molecular weight distribution.

The pH of the polymerization media may be in the range of pH 2-11, preferably 3-10, most preferably 4-10.

As said, the method of the invention is carried out in an aqueous medium in the presence of at least one radical initiator, i.e. any of the initiators known for initiating a free radical polymerization of ethylenically unsaturated monomers. Suitable radical initiators include notably peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, di-ter-butyl-peroxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic initiators include for example ammonium-, alkali- or earth alkali-salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include hydroxymethane sodium sulfinate (Rongalite) or fluoroalkyl sulfinates such as those disclosed in U.S. Pat. No. 5,285,002. The reducing agent typically reduces the half-life time of the persulfate initiator. Additionally, a metal salt catalyst such as for example copper, iron or silver salts may be added.

The amount of initiator may be between 0.01% by weight (based on the fluoropolymer to be produced) and 1% by weight. Still, the amount of initiator is preferably between 0.05 and 0.5% by weight and more preferably between 0.05 and 0.3% by weight, based on the fluoropolymer to be produced.

The aqueous emulsion polymerization can be carried out in the presence of other materials, such as notably paraffin waxes, buffers and, if desired, complex-formers or chain-transfer agents.

Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters can be effective as chain transfer agent in the method of the invention.

Further, the aqueous emulsion polymerization of the method of the invention can be carried out in the presence of certain fluorinated fluids deprived of ionisable groups, typically enabling formation of nanosized droplets (average size of less than 50 nm, preferably of less than 30 nm), and advantageously stabilized in aqueous dispersion by the presence of the dispersant (D).

Should the method of the invention be carried out in the presence of a fluorinated fluid, as above detailed, it may be preferable to first homogenously mix the dispersant (D) and said fluid in an aqueous medium, and then feeding the so obtained aqueous mixture of the dispersant (D) and said fluid in the polymerization medium. This technique is particularly advantageous as this pre-mix can advantageously enable manufacture of an emulsion of said fluid in an aqueous phase comprising the dispersant (D), wherein this emulsion comprises dispersed droplets of said fluid having an average size of preferably less than 50 nm, more preferably of less than 40 nm, even more preferably of less than 30 nm.

Fluids which can be used according to this embodiment are preferably (per)fluoropolyethers comprising recurring units (R1), said recurring units comprising at least one ether linkage in the main chain and at least one fluorine atom (fluoropolyoxyalkene chain). Preferably the recurring units R1 of the (per)fluoropolyether are selected from the group consisting of:
 (I) —CFX—O—, wherein X is —F or —CF$_3$; and
 (II) —CF$_2$—CFX—O—, wherein X is —F or —CF$_3$; and
 (III) —CF$_2$—CF$_2$—CF$_2$—O—; and
 (IV) —CF$_2$—CF$_2$—CF$_2$—CF$_2$—O—; and
 (V) —(CF$_2$)$_j$—CFZ—O— wherein j is an integer chosen from 0 and 1 and Z is a fluoropolyoxyalkene chain comprising from 1 to 10 recurring units chosen among the classes (I) to (IV) here above; and mixtures thereof.

Should the (per)fluoropolyether comprise recurring units R1 of different types, advantageously said recurring units are randomly distributed along the fluoropolyoxyalkene chain.

Preferably the (per)fluoropolyether is a compound complying with formula (I-p) here below:

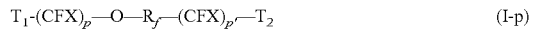
(I-p)

wherein:
each of X is independently F or CF$_3$;
p and p', equal or different each other, are integers from 0 to 3;
R$_f$ is a fluoropolyoxyalkene chain comprising repeating units R°, said repeating units being chosen among the group consisting of:
 (i) —CFXO—, wherein X is F or CF$_3$,
 (ii) —CF$_2$CFXO—, wherein X is F or CF$_3$,
 (iii) —CF$_2$CF$_2$CF$_2$O—,
 (iv) —CF$_2$CF$_2$CF$_2$CF$_2$O—,
 (v) —(CF$_2$)$_j$—CFZ—O— wherein j is an integer chosen from 0 and 1 and Z is a group of general formula —OR$_f'$T$_3$, wherein R$_f'$ is a fluoropolyoxyalkene chain comprising a number of repeating units from 0 to 10, said recurring units being chosen among the followings: —CFXO—, —CF$_2$CFXO—, —CF$_2$CF$_2$CF$_2$O—, —CF$_2$CF$_2$CF$_2$CF$_2$O—, with each of each of X being independently F or CF$_3$; and T$_3$ is a C$_1$-C$_3$ perfluoroalkyl group, and mixtures thereof;
T$_1$ and T$_2$, the same or different each other, are H, halogen atoms, C$_1$-C$_3$ fluoroalkyl groups, optionally comprising one or more H or halogen atoms different from fluorine.

As said, the method of the invention comprises emulsion polymerizing one or more than one fluorinated monomer.

The expression "fluorinated monomer" is hereby intended to denote an ethylenically unsaturated monomer comprising at least one fluorine atom.

The fluorinated monomer may further comprise one or more other halogen atoms (Cl, Br, I).

Non limiting examples of suitable ethylenically unsaturated fluorinated monomers are:
 C$_2$-C$_8$ perfluoroolefins, such as tetrafluoroethylene (TFE), hexafluoropropylene (HFP), perfluoroisobutylene;
 C$_2$-C$_8$ hydrogen-containing fluoroolefins, such as trifluoroethylene (TrFE), vinylidene fluoride (VDF), vinyl fluoride (VF), pentafluoropropylene, and hexafluoroisobutylene;
 C$_2$-C$_8$ chloro- and/or bromo- and/or iodo-containing fluoroolefins, such as chlorotrifluoroethylene (CTFE) and bromotrifluoroethylene;
 fluoroalkylvinylethers of formula CF$_2$=CFOR$_{f1}$, wherein R$_{f1}$ is a C$_1$-C$_6$ fluoroalkyl, e.g. —CF$_3$, —C$_2$F$_5$, —C$_3$F$_7$;
 fluorooxyalkylvinylethers of formula CF$_2$=CFOX$_0$, wherein X$_0$ is a C$_1$-C$_{12}$ fluorooxyalkyl group comprising one or more than one ethereal oxygen atom, including notably fluoromethoxyalkylvinylethers of formula CF$_2$=CFOCF$_2$OR$_{f2}$, with R$_{f2}$ being a C$_1$-C$_3$ fluoro(oxy)alkyl group, such as —CF$_2$CF$_3$, —CF$_2$CF$_2$—O—CF$_3$ and —CF$_3$
 fluorodioxoles, of formula:

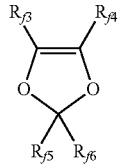

wherein each of R$_{f3}$, R$_{f4}$, R$_{f5}$, R$_{f6}$, equal or different each other, is independently a fluorine atom, a C$_1$-C$_6$ fluoro(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

Preferred fluorinated monomers for use in the method of the present invention include tetrafluoroethylene (TFE), chlorotrifluoroethylene (CTFE), hexafluoropropylene (HFP), vinyl fluoride (VF), vinylidene fluoride (VDF), and most preferably TFE or VDF, alone or combined, or in combination with other monomers.

The method of the invention may further involve one or more than one fluorine-free ethylenically unsaturated monomer, also referred to as "hydrogenated monomer". The choice of the said hydrogenated comonomer(s) is not particularly limited; alpha-olefins, (meth)acrylic monomers, vinyl ether monomers, styrenic mononomers may be used.

The method of the present invention may be used to produce a variety of fluoropolymers including perfluoropolymers, which have a fully fluorinated backbone, as well as partially fluorinated fluoropolymers. Also the method of the invention may result in melt-processable fluoropolymers as well as those that are not melt-processable such as for example polytetrafluoroethylene and so-called modified polytetrafluoroethylene. The method of the invention can further yield fluoropolymers that can be cured to make fluoroelastomers as well as fluorothermoplasts. Fluorothermoplasts are generally fluoropolymers that have a distinct and well noticeable melting point, typically in the range of 60 to 320° C. or between 100 and 320° C. They thus have a substantial crystalline phase. Fluoropolymers that are used for making fluoroelastomers typically are amorphous and/or have a negligible amount of crystallinity such that no or hardly any melting point is discernible for these fluoropolymers.

The Applicant has found that dispersants (D) are particularly effective for manufacturing thermoplastic vinylidene fluoride polymers by polymerizing vinylidene fluoride (VDF) optionally in combination with one or more than one hydrogenated and/or fluorinated monomer different from VDF, and/or for manufacturing thermoplastic tetrafluoroethylene polymers by polymerizing tetrafluoroethylene (TFE) optionally in combination with one or more than one hydrogenated and/or fluorinated monomer different from TFE.

Particularly good results have been obtained when using the dispersant (D) of the present invention for emulsion polymerizing TFE, either alone, or in combination with one or more than one fluorinated monomer different from TFE.

Generally speaking, the method of the invention is carried out in the substantial absence of fluorinated emulsifiers having a molecular weight of less than 1000.

The expression "substantial absence" when used in connection to the fluorinated emulsifiers means that no surfactant is purposely added to the polymerization. While impurities possibly qualifying as fluorinated surfactants with a molecular weight of less than 1000 might be tolerated, their amount is generally below of detection limit of standard analytical techniques (<1 ppm, with respect to the aqueous medium).

More generally, the method of the invention is carried out in the substantial absence of fluorinated emulsifiers having a molecular weight of less than 3000.

More specifically, the method of the invention include polymerizing in an aqueous medium which is substantially free from fluorinated emulsifier [surfactant (FS)] of formula:

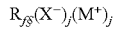

wherein $R_{fS}$ is a $C_3$-$C_{30}$ (per)fluoroalkyl chain, (per)fluoro(poly)oxyalkylenic chain, $X^-$ is —COO$^-$, —PO$_3^-$ or —SO$_3^-$, M$^+$ is selected from H$^+$, NH$_4^+$, an alkaline metal ion and j can be 1 or 2 can be used.

As non-limitative examples of surfactants (FS), mention may be made of ammonium and/or sodium (per)fluoro(oxy)carboxylates, and/or (per)fluoropolyoxyalkylenes having one or more carboxylic end groups.

Examples of fluorinated surfactants, in particular of (per)fluorooxyalkylenic surfactants, are notably described in US 2007015864 (3M INNOVATIVE PROPERTIES) Jan. 8, 2007, US 2007015865 (3M INNOVATIVE PROPERTIES CO) Jan. 18, 2007, US 2007015866 (3M INNOVATIVE PROPERTIES CO) Jan. 18, 2007, US 2007025902 (3M INNOVATIVE PROPERTIES CO) Feb. 1, 2007.

For instance, the fluorinated emulsifiers [surfactant (FS)] substantially excluded from the method of the invention are notably:

- $CF_3(CF_2)_{n1}COOM'$, in which $n_1$ is an integer ranging from 4 to 10, preferably from 5 to 7, and more preferably being equal to 6; M' represents H, NH$_4$, Na, Li or K, preferably NH$_4$;
- $T(C_3F_6O)_{n0}(CFXO)_{m0}CF_2COOM''$, in which T represents Cl or a perfluoroalkoxyde group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M'' represents H, NH$_4$, Na, Li or K; X represents F or $CF_3$;
- F—(CF$_2$—CF$_2$)$_{n2}$—CH$_2$—CH$_2$—RO$_3$M''', in which R is P or S, preferably S, M''' represents H, NH$_4$, Na, Li or K, preferably H; $n_2$ is an integer ranging from 2 to 5, preferably $n_2$=3;
- A-R$_f$—B bifunctional fluorinated surfactants, in which A and B, equal to or different from each other, are —(O)$_p$CFX—COOM*; M* represents H, NH$_4$, Na, Li or K, preferably M* represents NH$_4$; X=F or CF$_3$; p is an integer equal to 0 or 1; R$_f$ is a linear or branched perfluoroalkyl chain, or a (per)fluoropolyether chain such that the number average molecular weight of A-R$_f$—B is in the range 300 to 1,000;
- R'$_f$—O—(CF$_2$)$_r$—O-L-COOM', wherein R'$_f$ is a linear or branched perfluoroalkyl chain, optionally comprising catenary oxygen atoms, M' is H, NH$_4$, Na, Li or K, preferably M' represents NH$_4$; r is 1 to 3; L is a bivalent fluorinated bridging group, preferably —CF$_2$CF$_2$— or —CFX—, X=F or CF$_3$;
- R''$_f$—(OCF$_2$)$_u$—O—(CF$_2$)$_v$—COOM'', wherein R''$_f$ is a linear or branched perfluoroalkyl chain, optionally comprising catenary oxygen atoms, M'' is H, NH$_4$, Na, Li or K, preferably M'' represents NH$_4$; u and v are integers from 1 to 3;
- R'''$_f$—(O)$_t$—CHQ-L-COOM''', wherein R'''$_f$ is a linear or branched perfluoroalkyl chain, optionally comprising catenary oxygen atoms, Q=F or CF$_3$, t is 0 or 1, M''' is H, NH$_4$, Na, Li or K, preferably M''' is NH$_4$; L is a bivalent fluorinated bridging group, preferably —CF$_2$CF$_2$— or —CFX—, X=F or CF$_3$;
- cyclic fluorocompound of the following formula (I):

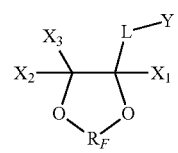

wherein $X_1$, $X_2$, $X_3$, equal or different from each other are independently selected among H, F, and $C_{1-6}$ (per)fluoroalkyl groups, optionally comprising one or more catenary or non-catenary oxygen atoms; L represents a bond or a divalent group; $R_F$ is a divalent fluorinated $C_{1-3}$ bridging group; Y is a hydrophilic function selected from groups of formulae:

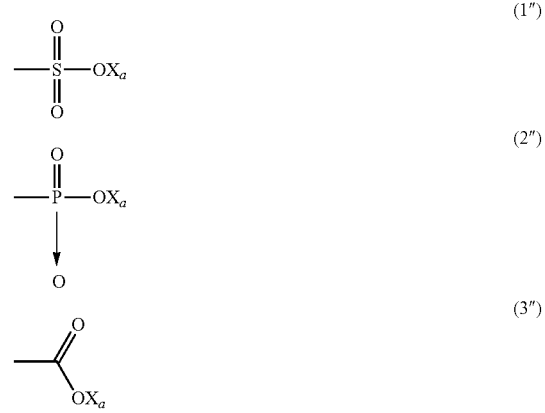

wherein $X_a$ is H, a monovalent metal (preferably an alkaline metal) or an ammonium group of formula —N(R'$_n$)$_4$, wherein R'$_n$, equal or different at each occurrence, represents a hydrogen atom or a $C_{1-6}$ hydrocarbon group.

The method of the invention typically results in an aqueous dispersion of the fluoropolymer further comprising dispersant (D), as above detailed, which is another object of the present invention.

The invention hence pertains to an aqueous dispersion of fluoropolymer particles comprising at least one dispersant (D), as detailed above.

All preferred embodiments described above for the dispersant (D) and the fluoropolymer in connection with the method of the invention are equally applicable to the aqueous dispersion of the invention, to the extent these features may characterize the same.

The particle size (volume average diameter) of the fluoropolymer is typically between 40 nm and 400 nm with a typical particle size between 60 nm and about 350 nm being preferred.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$— end groups.

For coating applications, an aqueous dispersion of the fluoropolymer is desired and hence the fluoropolymer will not need to be separated or coagulated from the dispersion. To obtain a fluoropolymer dispersion suitable for use in coating applications such as for example in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids. Examples of non-ionic surfactants that may be added include $R^1$—O—[CH$_2$CH$_2$O]$_n$—[R$^2$O]$_m$—R$^3$ (NS) wherein $R^1$ represents an aromatic or aliphatic hydrocarbon group having from 6 to 18 carbon atoms, $R^2$ represents an alkylene having 3 carbon atoms, $R^3$ represents hydrogen or a $C_{1-3}$ alkyl group, n has a value of 0 to 40, m has a value of 0 to 40 and the sum of n+m being at least 2. It will be understood that in the above formula (NS), the units indexed by n and m may appear as blocks or they may be present in an alternating or random configuration. Examples of non-ionic surfactants according to formula (NS) above include alkylphenol oxy ethylates such as ethoxylated p-isooctylphenol commercially available under the brand name TRITON™ such as for example TRITON™×100 wherein the number of ethoxy units is about 10 or TRITON™×114 wherein the number of ethoxy units is about 7 to 8. Still further examples include those in which $R^1$ in the above formula (NS) represents an alkyl group of 4 to 20 carbon atoms, m is 0 and $R^3$ is hydrogen. An example thereof includes isotridecanol ethoxylated with about 8 ethoxy groups and which is commercially available as GENAPOL®x080 from Clariant GmbH. Non-ionic surfactants according to formula (NS) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of fluoropolymer solids in the dispersion may be upconcentrated as needed or desired to an amount between 30 and 70% by weight. Any of the known upconcentration techniques may be used including ultrafiltration and thermal upconcentration.

Should the disclosure of any patents, patent applications, and publications which are incorporated herein by reference conflict with the description of the present application to the extent that it may render a term unclear, the present description shall take precedence.

The invention will be now explained in more detail with reference to the following examples, whose purpose is merely illustrative and not intended to limit the scope of the invention.

Preparative Example 1—Preparation of Dispersant (D-1) by Polymerization of Tetrafluoroethylene (TFE) and perfluoro-5-sulfonylfluoride-3-oxa-1-pentene (SFVE) and Successive Hydrolysis Step 1—Polymerization
In a 5 L autoclave the following reagents were charged:
1.9 L of demineralized water;
185 g of the monomer with formula: $CF_2$=CF—O—$CF_2CF_2$—$SO_2F$ (SFVE);
500 g of a 46 wt % aqueous solution of the ammonium salt of the

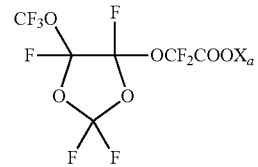

with $X_a$ being $NH_4$.

The autoclave, stirred at 650 rpm, was heated at 65° C. A water based solution with 16 g/L of potassium persulfate was added in a quantity of 90 mL. The pressure was maintained at a value of 10 bar (abs.) by 4 bar pf feeding tetrafluoroethylene (TFE), 5.5 bar of $CO_2$ and 0.1 bar of ethane. After adding 68 g of tetrafluoroethylene in the reactor, 40 g of the monomer SFVE were fed to the autoclave; after adding further 22 g of tetrafluoroethylene in the reactor, 55 g of monomer SFVE were added every 22 g of tetrafluoroethylene consumed by the reaction.

The reaction was stopped after 540 min by stopping the stirring, cooling the autoclave and reducing the pressure by venting the TFE; a total of 450 g of TFE was fed into the autoclave.

A copolymer was obtained, said copolymer comprising about 2.2 eq/g of sulfonyl fluoride groups and possessing the following composition: TFE: 63.3 mol %; SFVE: 36.7 mol % as determined by NMR measurements. GPC measurements, carried out against polystyrene standards in dimethylacetamide as solvent, provided for a weight averaged molecular weight of 95 000. Substantially no fraction having a molecular weight below 3 000 was detected by GPC.

Step 2—Hydrolysis and Purification
The latex obtained in Step 1 was degassed for 1 night with nitrogen flow to remove monomers' residuals, charged in an agitated glass vessel and heated at 90° C. under moderate stirring.

A water based solution of NaOH (5% concentrated) was added drop wise until a molar quantity of NaOH corresponding to 20% of the —$SO_2F$ groups present on the polymer is reached. After 30 minutes, additional NaOH was added so to obtain a molar ratio 4:1 between the equivalents of NaOH added and the overall amount of SO$_2$F groups present in the polymer. The solution so obtained was kept one hour at 90° C. under moderate stirring, and no coagulation was formed during the whole process.

One sample of the solution was dried in ventilated oven for 1 night and the solid residue was characterized by infrared spectroscopy to confirm that all SO$_2$F groups originally comprised in the dispersant precursor were converted into —SO$_3$Na groups: no signal of residual SO$_2$F was detected. The solution cooled at ambient temperature was fed to a column containing resin Dowex Monosphere® 650C UPW previously treated with 1 M nitric acid and washed with demineralized water to remove cations (in particular excess Na$^+$ cations) and convert the SO$_3$Na groups of the dispersant (D-1) into —SO$_3$H groups. In a next step the solution so obtained of dispersant (D-1) was fed in a second column containing Dowex Monosphere® 550A previously treated with 1M NaOH and washed with demineralized water to remove the fluoride generated from the —SO$_2$F conversion and other anionic species present in the dispersion, such as for instance fluorosurfactant anionic moieties. After these treatments, pH of the solution was found to be around 2; diluted NaOH was added dropwise to reach neutral pH, thus converting the —SO$_3$H groups of the dispersant (D-1) into —SO$_3$Na groups.

ICP analysis indicated absence of cations different than Na, liquid chromatography analysis indicated absence of fluorides and other anionic species. The dispersant (D-1) aqueous solution was concentrated by using a reverse osmosis system to get a 15% solid content and resulted completely stable (absence of coagulum).

Polymerization Example 2: Polymerization of Tetrafluoroethylene (TFE) in the Presence of Dispersant (D-1)

In a 5 L autoclave the following reagents were charged:
2.0 L of demineralized water;
150 g of a 15 wt % aqueous dispersion of dispersant (D-1) (i.e. corresponding to 22.5 g of dispersant (D-1)), obtained from Preparative Example 1, thus corresponding to a concentration of about 1.12% based on the aqueous phase.

The autoclave, stirred at 500 rpm, was heated at 80° C. A water based solution with 6 g/L of potassium persulfate was added in a quantity of 15 mL. The pressure was maintained at a value of 12.4 bar (abs.) by feeding tetrafluoroethylene (TFE).

The pressure of the autoclave was maintained at constant value of 12.4 bar by feeding TFE until a quantity of 600 grams of TFE were fed, after 182 minutes the TFE feeding was stopped. By keeping constant stirring of 500 rpm the autoclave was cooled to ambient temperature the latex was discharged after being kept under nitrogen bubbling for 16 hours to strip away residual monomers from the polymerization, and then stored in a plastic tank. No signals of latex coagulation/precipitation were observed. The PTFE dispersion so produced was characterized by laser light scattering for determining average particle size, which was found to be of 72 nm.

The PTFE so formed was coagulated cryogenically, and dried; a sample of water liquor separated off from coagulum was submitted to NMR analysis, and no dispersant (D-1) was detected, conveying the conclusion that dispersant (D-1) remained entrapped in the so-coagulated PTFE.

The PTFE was analysed by DSC and found to possess a $\Delta H_f$ of 47.98 J/g and a $T_f$ of 329.89° C., these two properties being determined on second heating cycle, according to ASTM D3418.

Comparative Example 3: Polymerization of Tetrafluoroethylene (TFE) with Fluorinated Surfactant of the Prior Art In a 5 L autoclave the following reagents were charged:
2.0 L of demineralized water;
38 g of a 46 wt % aqueous solution of the ammonium salt of the fluorocompound of formula

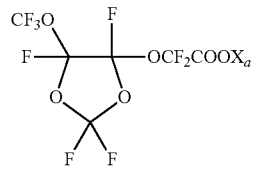

with X$_a$ being NH$_4$, corresponding to a concentration of about 0.9% based on the aqueous phase.

The autoclave, stirred at 500 rpm, was heated at 80° C. A water based solution with 6 g/L of potassium persulfate was added in a quantity of 15 mL. The pressure was maintained at a value of 12.4 bar (abs.) by feeding tetrafluoroethylene (TFE).

The pressure of the autoclave was maintained at constant value of 12.4 bar by feeding TFE until a quantity of 600 grams of TFE were fed, after 300 minutes the TFE feeding was stopped. By keeping constant stirring of 500 rpm the autoclave was cooled to ambient temperature the latex was discharged after being kept under nitrogen bubbling for 16 hours to strip away residual monomers from the polymerization, and then stored in a plastic tank. No signals of latex coagulation/precipitation were observed. The PTFE dispersion so produced was characterized by laser light scattering for determining average particle size, which was found to be of 134 nm, significantly higher than the size of dispersion from Ex. 2, clearly demonstrating the effectiveness of dispersant (D) to create fine and segregated emulsion polymerization sites.

The PTFE was analysed by DSC and found to possess a $\Delta H_f$ of 46.07 J/g and a $T_f$ of 329.14° C., these two properties being determined on second heating cycle, according to ASTM D3418, conveying the conclusion that the PTFE materials obtained from Ex. 2 and from Ex. 3C possess essentially same properties, including substantially same molecular weight.

The invention claimed is:
1. A method for making a fluoropolymer, the method comprising emulsion polymerizing one or more than one fluorinated monomer in an aqueous medium wherein said aqueous emulsion polymerization is carried out in an aqueous medium in the presence of at least one radical initiator and at least one polyfunctional dispersant [dispersant (D)], said dispersant (D):
    comprising a backbone chain comprising recurring units derived from one or more ethylenically unsaturated monomers,
    having a molecular weight and distribution thereof such that said dispersant (D) is substantially free from fractions having molecular weight of less than 3 000, comprising a plurality of ionisable groups selected from the group consisting of —$SO_3X_a$, —$PO_3X_a$ and —$COOX_a$, whereas $X_a$ is H, an ammonium group or a monovalent metal, in an amount of at least 1.75 meq/g, with respect to the weight of dispersant (D), wherein the said dispersant (D) is used in an amount of at least 0.01% by weight and at most 5.00% by weight, based on the total weight of the aqueous medium.

2. The method of claim 1, wherein the amount of dispersant (D) is of at least 0.05% wt and at most 4.00% wt with respect to the total weight of the aqueous medium.

3. The method of claim 1, wherein dispersant (D) possesses a weight averaged molecular weight (Mw), as measured by GPC, of at least 10 000, and/or of at most 1 000 000.

4. The method of claim 1, wherein the amount of said ionisable groups in dispersant (D) is of at least 1.80 meq/g, with respect to the weight of dispersant (D), and of at most 2.50 meq/g.

5. The method of claim 1, wherein dispersant (D) comprises said ionisable groups as pendant groups covalently bound to recurring units derived from an ethylenically unsaturated functional monomer (monomer (X), herein below) and wherein dispersant (D) either consists essentially of recurring units derived from one or more than one monomer (X), or is a copolymer comprising recurring units derived from one or more than one monomer (X) and recurring units derived from one or more than one additional monomer different from monomer (X).

6. The method of claim 5, wherein dispersant (D) is a dispersant ($D_{SO3x}$), wherein dispersant ($D_{SO3x}$) is a polymer comprising a plurality of —$SO_3X_a$ groups, wherein $X_a$ is H, an ammonium group or a monovalent metal, and wherein dispersant ($D_{SO3x}$) consists essentially of recurring units derived from one or more than one ethylenically unsaturated functional monomer comprising a —$SO_3X_a$ group [monomer ($X_{SO3x}$)], or comprises recurring units derived from one or more than one monomer ($X_{SO3x}$) and recurring units derived from one or more than one additional monomer different from monomer ($X_{SO3x}$).

7. The method of claim 6, wherein dispersant ($D_{SO3x}$) is selected from the group consisting of polymers comprising recurring units derived from at least one ethylenically unsaturated fluorinated monomer containing at least one —$SO_2X$ group, wherein X is a halogen or —$OX_a$, with $X_a$ being H, an ammonium group or a monovalent metal (monomer (A), hereinafter); and recurring units derived from at least one ethylenically unsaturated fluorinated monomer free from —$SO_2X$ group (monomer (B), hereinafter).

8. The method of claim 7, wherein at least one monomer (B) of the dispersant ($D_{SO3x}$) is tetrafluoroethylene (TFE).

9. The method of claim 8, wherein the dispersant ($D_{SO3x}$) is a dispersant ($D^{TFE}_{SO3x}$) selected from polymers consisting essentially of:
(1) recurring units derived from tetrafluoroethylene (TFE), these recurring units (1) being present in an amount of 50 to 99% moles, with respect to total moles of dispersant ($D^{TFE}_{SO3x}$);
(2) recurring units derived from at least one monomer selected from the group consisting of:
j) sulfonyl halide fluorovinylethers of formula: $CF_2=CF-O-(CF_2)_mSO_2X$, wherein X is $OX_a$, with $X_a$ being H, an ammonium group or a monovalent metal; F or Cl, and m is an integer between 1 and 10;
jj) sulfonyl fluoride fluoroalkoxyvinylethers of formula: $CF_2=CF-(OCF_2CF(RH))_w-O-CF_2(CF(R_{F2}))_y$ $SO_2X$ wherein X is $OX_a$, with $X_a$ being H, an ammonium group or a monovalent metal; F or Cl, w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, and y is an integer between 0 and 6; and
jjj) mixtures thereof;
these recurring units (2) being present in an amount of 1 to 50% moles, with respect to total moles of dispersant ($D^{TFE}_{SO3x}$); and
(3) optionally, recurring units derived from at least one hydrogenate and/or perfluorinated monomer selected from the group consisting of hexafluoropropylene, perfluoroalkylvinylethers of formula $CF_2=CFOR'_{f1}$, wherein $R'_{f1}$ is a $C_1$-$C_6$ perfluoroalkyl; perfluoro-oxyalkylvinylethers of formula $CF_2=CFOR'_{f1}$, wherein $R'_{O1}$ is a $C_2$-$C_{12}$ perfluoro-oxyalkyl having one or more ether groups, perfluoroalkyl-methoxy-vinylethers of formula $CF_2=CFOCF_2OR'_{f2}$ in which $R'_{f2}$ is a $C_1$-$C_6$ perfluoroalkyl or a $C_1$-$C_6$ perfluorooxyalkyl having one or more ether groups; these recurring units (3) being present in an amount of 0 to 45% moles, with respect to total moles of dispersant ($D^{TFE}_{SO3x}$).

10. The method of claim 7, wherein at least one monomer (B) of the dispersant ($D_{SO3x}$) is vinylidene fluoride (VDF).

11. The method of claim 10, wherein the dispersant (Ds03x) is a dispersant ($D^{VDF}_{SO3x}$) selected from polymers consisting essentially of:
(1) recurring units derived from vinylidene fluoride (VDF), these recurring units (1) being generally in an amount of 55 to 99% moles, with respect to total moles of dispersant ($D^{VDF}_{SO3x}$);
(2) recurring units derived from at least one monomer selected from the group consisting of:
j) sulfonyl halide fluorovinylethers of formula: $CF_2=CF-O-(CF_2)_mSO_2X$, wherein X is $OX_a$, with $X_a$ being H, an ammonium group or a monovalent metal; F or Cl, and m is an integer between 1 and 10;
jj) sulfonyl fluoride fluoroalkoxyvinylethers of formula: $CF_2=CF-(OCF_2CF(R_{F1}))_w-O-CF_2(CF(R_{F2}))_y$ $SO_2X$, wherein X is $OX_a$, with $X_a$ being H, an ammonium group or a monovalent metal; F or Cl, w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, and y is an integer between 0 and 6; and
jjj) mixtures thereof;
these recurring units (2) being present in an amount of 1 to 45% moles, with respect to total moles of dispersant ($D^{VDF}_{SO3x}$); and
(3) optionally, recurring units derived from at least one hydrogenated monomer or fluorinated monomer different from VDF; these recurring units (3) being present in an amount of 0 to 25% moles, with respect to total moles of dispersant ($D^{VDF}_{SO3x}$).

12. The method according to claim 7, wherein monomer (A) is selected from the group consisting of:
sulfonyl halide fluoroolefins of formula: $CF_2=CF(CF_2)_p$ $SO_2X$; wherein X is $OX_a$, with $X_a$ being H, an ammonium group or a monovalent metal; F or Cl, and p is an integer between 0 and 10;
sulfonyl halide fluorovinylethers of formula: $CF_2=CF-O-(CF_2)_mSO_2X$, wherein X is $OX_a$, with $X_a$ being H, an ammonium group or a monovalent metal; F or Cl, and m is an integer between 1 and 10;

sulfonyl fluoride fluoroalkoxyvinylethers of formula: $CF_2=CF-(OCF_2CF(RH))_w-O-CF_2(CF(R_{F2}))_y-SO_2X$ wherein X is $OX_a$, with $X_a$ being H, an ammonium group or a monovalent metal; F or Cl, w is an integer between 0 and 2, $R_{F1}$ and $R_{F2}$, equal or different from each other, are independently F, Cl or a C1-C10 fluoroalkyl group, optionally substituted with one or more ether oxygens, and y is an integer between 0 and 6;

sulfonyl halide aromatic fluoroolefins of formula $CF_2=CF-Ar-SO_2X$ wherein X is $OX_a$, with $X_a$ being H, an ammonium group or a monovalent metal; F or Cl, and Ar is a $C_5$-$C_{15}$ aromatic or heteroaromatic group;

and/or wherein monomer (B) is selected from the group consisting of:

$C_2$-$C_8$ perfluoroolefins;

$C_2$-$C_8$ hydrogen-containing fluoroolefins;

$C_2$-$C_8$ chloro- and/or bromo- and/or iodo-containing fluoroolefins;

fluoroalkylvinylethers of formula $CF_2=CFOR_{f1}$, wherein $R_{f1}$ is a $C_1$-$C_6$ fluoroalkyl;

fluorooxyalkylvinylethers of formula $CF_2=CFOX_0$, wherein $X_0$ is a $C_1$-$C_{12}$ fluorooxyalkyl group comprising one or more than one ethereal oxygen atom; and fluorodioxoles, of formula:

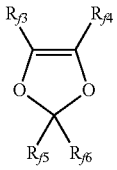

wherein each of $R_{f3}$, $R_{f4}$, $R_{f5}$, $R_{f6}$, equal or different each other, is independently a fluorine atom or a $C_1$-$C_6$ fluoro(halo)fluoroalkyl, optionally comprising one or more oxygen atom.

13. The method of claim 1, wherein the aqueous emulsion polymerization is carried out at a temperature between 10° C. and 150° C. and/or at a pressure between 2 and 60 bar.

14. The method according to claim 1, wherein the radical initiator is selected from peroxides and azo compounds and redox based initiators and/or wherein the amount of initiator is between 0.01% by weight and 1% by weight (based on the fluoropolymer to be produced).

15. The method according to claim 1, wherein the aqueous emulsion polymerization is carried out in the presence of fluorinated fluids deprived of ionisable groups.

16. The method of claim 15, wherein fluorinated fluids are selected from the group consisting of (per)fluoropolyethers comprising recurring units (R1), said recurring units comprising at least one ether linkage in the main chain and at least one fluorine atom.

17. The method of claim 16, wherein the recurring units (R1) of the (per)fluoropolyether are selected from the group consisting of:

(I) —CFX—O—, wherein X is —F or —$CF_3$; and (II) —$CF_2$—CFX—O—, wherein X is —F or —$CF_3$; and (III) —$CF_2$—$CF_2$—$CF_2$—O—; and (IV) —$CF_2$—$CF_2$—$CF_2$—$CF_2$—O—; and (V) —$(CF_2)_3$—CFZ—O— wherein j is an integer chosen from 0 and 1 and Z is a fluoropolyoxyalkene chain comprising from 1 to 10 recurring units chosen among the classes (I) to (IV) here above; and mixtures thereof.

18. The method according to claim 1, said method comprising polymerizing one or more than one fluorinated monomer selected from the group consisting of:

$C_2$-$C_8$ perfluoroolefins;

$C_2$-$C_8$ hydrogen-containing fluoroolefins;

$C_2$-$C_8$ chloro- and/or bromo and/or iodo-containing fluoroolefins;

fluoroalkylvinylethers of formula $CF_2=CFOR_{f1}$, wherein $R_{f1}$ is a $C_1$-$C_6$ fluoroalkyl;

fluorooxyalkylvinylethers of formula $CF_2=CFOX_0$, wherein Xo is a $C_1$-$C_{12}$ fluorooxyalkyl group comprising one or more than one ethereal oxygen atom; and fluorodioxoles, of formula:

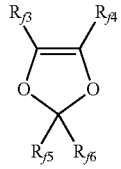

wherein each of $R_{f3}$, $R_{f4}$, $R_{f5}$, $R_{f6}$, equal or different each other, is independently a fluorine atom, or a $C_1$-$C_6$ fluoro(halo)fluoroalkyl, optionally comprising one or more oxygen atom.

19. The method according to claim 18, wherein the one or more than one fluorinated monomer is each independently selected from the group consisting of:

tetrafluoroethylene (TFE); hexafluoropropylene (HFP); perfluoroisobutylene;

trifluoroethylene (TrFE); vinylidene fluoride (VDF); vinyl fluoride (VF);

pentafluoropropylene; hexafluoroisobutylene; chlorotrifluoroethylene (CTFE);

bromotrifluoroethylene; fluoroalkylvinylethers of formula $CF_2=CFOR_{f1}$, wherein $R_{f1}$ is —$CF_3$, —$C_2F_5$, or —$C_3F_7$; fluoromethoxyalkylvinylethers of formula $CF_2=CFOCF_2OR_{f2}$, wherein $R_{f2}$ is a $C_1$-$C_3$ fluoro(oxy)alkyl group; and fluorodioxoles, of formula:

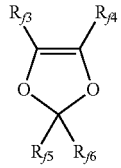

wherein each of $R_{f3}$, $R_{f4}$, $R_{f5}$, $R_{f6}$, equal or different each other, is independently —F, —$CF_3$, —$C_2F_5$, —$C_3F_7$, —$OCF_3$, or —$OCF_2CF_2OCF_3$.

* * * * *